United States Patent
Kobayashi

(10) Patent No.: US 8,833,205 B2
(45) Date of Patent: Sep. 16, 2014

(54) WAVE GENERATOR OF WAVE GEAR DEVICE

(75) Inventor: Masaru Kobayashi, Azumino (JP)

(73) Assignee: Harmonic Drive Systems Inc., Tokyo (JP)

( * ) Notice: Subject to any disclaimer, the term of this patent is extended or adjusted under 35 U.S.C. 154(b) by 181 days.

(21) Appl. No.: 13/696,004

(22) PCT Filed: May 23, 2012

(86) PCT No.: PCT/JP2012/003377
§ 371 (c)(1), (2), (4) Date: Nov. 2, 2012

(87) PCT Pub. No.: WO2013/175533
PCT Pub. Date: Nov. 28, 2013

(65) Prior Publication Data
US 2013/0316868 A1  Nov. 28, 2013

(51) Int. Cl.
*F16H 33/00* (2006.01)
*F16H 1/32* (2006.01)
*F16H 49/00* (2006.01)

(52) U.S. Cl.
CPC ............... *F16H 1/32* (2013.01); *F16H 49/001* (2013.01)
USPC .......................................................... 74/640

(58) Field of Classification Search
CPC ....................... F16H 49/001; F16H 55/0833
USPC .......................................................... 74/640
See application file for complete search history.

(56) References Cited

U.S. PATENT DOCUMENTS

| | | | |
|---|---|---|---|
| 3,178,963 A | 4/1965 | Musser | |
| 7,249,536 B2 * | 7/2007 | Kiyosawa et al. | 74/640 |
| 7,694,607 B2 * | 4/2010 | Ishikawa et al. | 74/640 |
| 7,698,968 B2 * | 4/2010 | Kobayashi | 74/640 |
| 7,721,625 B2 * | 5/2010 | Saito | 74/640 |
| 8,020,470 B2 * | 9/2011 | Saito | 74/640 |
| 8,215,205 B2 * | 7/2012 | Zhang | 74/640 |

FOREIGN PATENT DOCUMENTS

| | | |
|---|---|---|
| JP | 60-185747 U | 12/1985 |
| JP | 63-125247 U | 8/1988 |
| JP | 3-4955 U | 1/1991 |
| JP | 3-4956 U | 1/1991 |
| JP | 2003-232411 A | 8/2003 |
| JP | 2007-205450 A | 8/2007 |

OTHER PUBLICATIONS

International Search Report (PCT/ISA/210) issued on Jul. 17, 2012, by the Japanese Patent Office as the International Searching Authority for International Application No. PCT/JP2012/003377.

* cited by examiner

*Primary Examiner* — Ha D Ho
(74) *Attorney, Agent, or Firm* — Buchanan Ingersoll & Rooney PC

(57) ABSTRACT

An externally toothed portion of a cup-shaped flexible externally toothed gear of a wave gear device is flexed into an ellipsoidal shape by a six-roller-type wave generator. A region of an inner peripheral surface of the ellipsoidally flexed externally toothed portion that is positioned on a major axis of the ellipsoidal shape is maximally inclined. First rollers of the wave generator are arranged so that the incline is identical to the incline of the region of the inner peripheral surface. A circular outer peripheral surface of the first rollers can be brought into contact with the region of the inner peripheral surface in an external-tooth tooth-trace direction without deflection; therefore, the angular transmission precision of the wave gear device can be improved.

8 Claims, 7 Drawing Sheets

WAVE GENERATOR OF WAVE GEAR DEVICE

TECHNICAL FIELD

The present invention relates to a wave gear device, and in particular to a roller-type wave generator in which a cup-shaped or silk-hat-shaped flexible externally toothed gear is flexed into an ellipsoidal shape by a plurality of rollers and caused to mesh with a rigid internally toothed gear.

BACKGROUND ART

Roller-type wave generators are known as wave generators for wave gear devices. A roller-type wave generator is provided with a plurality of rollers to flex a flexible externally toothed gear of a wave gear device into an ellipsoidal shape. Patent documents 1 and 2 disclose a two-roller-type wave generator for flexing a cup-shaped flexible externally toothed gear into an ellipsoidal shape using two rollers. Patent document 3 discloses a two-roller-type wave generator, and also discloses a six-roller-type wave generator provided with a pair of rollers arranged on a major axis in a cup-shaped flexible externally toothed gear flexed into an ellipsoidal shape; and two pairs of rollers arranged between the major axis and a minor axis.

PRIOR ART DOCUMENTS

Patent Documents

Patent Document 1: JP-U 03-4955
Patent Document 2: JP-U 03-4956
Patent Document 3: JP-A 2003-232411

DISCLOSURE OF THE INVENTION

Problem to be Solved by the Invention

As schematically shown in FIG. 7, when a cup-shaped or silk-hat-shaped flexible externally toothed gear is flexed into an ellipsoidal shape by a wave generator, the amount of flexing increases depending on the distance from a diaphragm. In the drawing, the direction of a center axis line 101 of a flexible externally toothed gear 100 is represented by the x-axis and the radial direction thereof is represented by the y-axis.

As represented in the drawing, the flexible externally toothed gear 100 is provided with a cylindrical middle part 102 flexable in the radial direction, and external teeth 104 are formed on an outer peripheral surface portion toward an opening edge 103 on the distal-end side thereof. A diaphragm 105 inwardly extending in the radial direction is continuous with a trailing end of the cylindrical middle part 102, and a thick-walled annular boss 106 is formed continuously on an inner peripheral edge of the diaphragm 105.

An externally toothed portion of the flexible externally toothed gear 100 where the external teeth 104 are formed is flexed into an ellipsoidal shape by a wave generator (not shown). The cylindrical middle part 102 and the diaphragm 105 of the flexible externally toothed gear 100 are repeatedly flexed when the wave generator rotates, as schematically represented in the drawing. In a region on the major axis on the cylindrical ellipsoidally flexed middle part 102, the amount of flexing in the outward radial direction increases toward the opening edge 103 from the diaphragm 105 along the tooth-trace direction of the external tooth 104, as represented by the dotted line A; the amount of flexing increasing substantially in proportion to the distance from the diaphragm 105. In a region on the minor axis the amount of flexing to the inside in the radial direction increases substantially in proportion to the distance from the diaphragm 105, as represented by an imaginary line. B. An inner peripheral surface 107 of the externally toothed portion of the flexible externally toothed gear 100 maximally inclines toward the center axis line 101 of the flexible externally toothed gear 100 in the positions on the major and minor axes.

In conventional roller-type wave generators, each of the rollers is supported so that the center axis line thereof lies parallel to the center axis line of the flexible externally toothed gear 100. On a circular outer peripheral surface of the roller (a circular outer peripheral surface of a bearing outer race of a roller) there is deflection in the tooth-trace direction of the external tooth with respect to a region contacting the inner peripheral surface 107 of the externally toothed portion. In particular, with rollers arranged on the major axis, a large amount of deflection occurs on the region contacting the inner peripheral surface 107 of the externally toothed portion. As a result, a risk is presented that the precision of angular transmission, which is a significant characteristic of a wave gear device, will be adversely affected.

With the foregoing in view, it is an object of the present invention to present a roller-type wave generator having a structure in which no deflection occurs in regions of contact made with cup-shaped or silk-hat-shaped flexible externally toothed gears.

Means to Solve the Problem

According to the present invention, an externally toothed portion of a cup-shaped or silk-hat-shaped flexible externally toothed gear is flexed into an ellipsoidal shape by a roller-type wave generator. When the ellipsoidally flexed externally toothed portion is sectioned along a plane including the gear center axis line of the flexible externally toothed gear, the incline of an outer peripheral surface of a roller positioned on a major axis of the ellipsoidally flexed externally toothed portion is set so that the incline matches the incline of an inner peripheral surface of the externally toothed portion. When rollers having a circular outer peripheral surface of identical size are provided, the center axis line of the rollers may be inclined. The center axis line of the roller is set so as to be parallel to the center axis line of the flexible externally toothed gear. It is also possible for the circular outer peripheral surface of the roller to be tapered, and for the taper angle to be set to an angle corresponding to the incline of the inner peripheral surface of the externally toothed portion.

On the inner peripheral surface of the ellipsoidally flexed externally toothed portion, the outer peripheral surface of the roller can be brought into contact with the maximally inclined portion of the inner peripheral surface positioned on the major axis, in a tooth-trace direction of an external tooth, without deflection. It is thereby possible to prevent or minimize any decrease in the angular transmission precision of a wave gear device.

For a roller of the wave generator making contact with a region other than a major-axis position on the inner peripheral surface of the ellipsoidally flexed externally toothed portion, the outer peripheral surface of the roller is preferably inclined so that the incline matches the incline of the inner peripheral surface of the externally toothed portion in the respective positions. Thus, each of the rollers of the wave generator can be brought into contact with the inner peripheral surface of the externally toothed portion of the flexible externally toothed gear, without deflecting.

MODE FOR CARRYING OUT THE INVENTION

Embodiments of a wave gear device in which the present invention is applied shall be described below with reference to the accompanying drawings.

Figure 1:
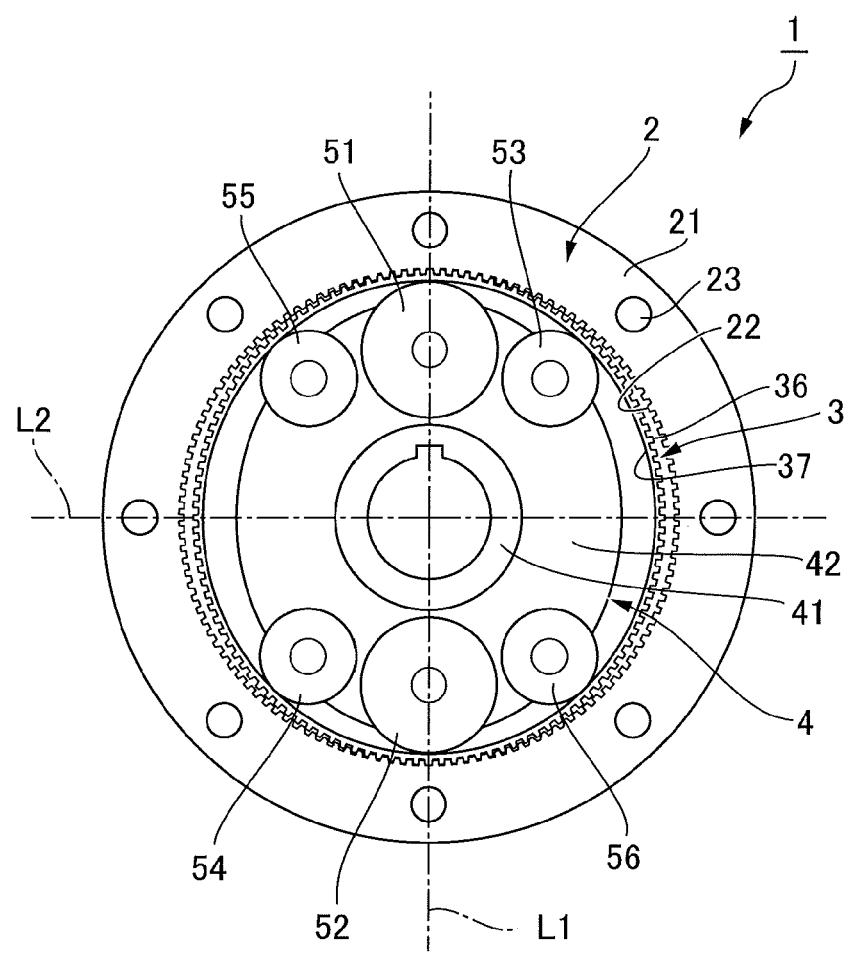
FIG. 1 is a schematic front view representing the wave gear device in which the present invention is applied.
Figure 2:
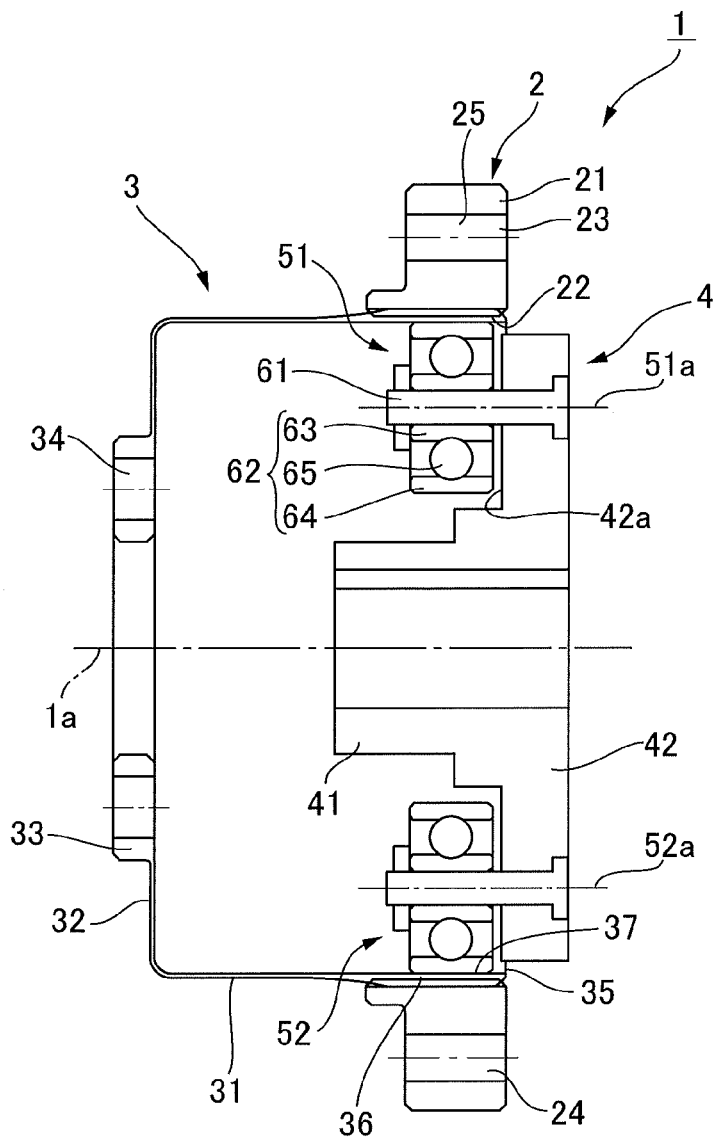
FIG. 2 is a schematic vertical sectional view of the wave gear device of FIG. 1.

FIGS. 1 and 2 are a schematic front view and a schematic vertical sectional view, respectively, representing a wave gear device of the embodiments. A "cup-type" wave gear device 1 has an annular rigid internally toothed gear 2, a cup-shaped flexible externally toothed gear 3 arranged inside the rigid internally toothed gear 2, and a six-roller-type wave generator 4 arranged inside of the flexible externally toothed gear 3. The flexible externally toothed gear 3 is flexed into an ellipsoidal shape by the wave generator 4, and a portion of external teeth positioned on a major axis L1 on the ellipsoidally flexed flexible externally toothed gear 3 is caused to mesh with internal teeth of the rigid internally toothed gear 2.

When the wave generator 4 is caused to rotate at a high speed by a motor (not shown), a position at which the two gears 2, 3 mesh is moved in a circumferential direction, and relative rotation is generated between the two gears 2, 3 in correspondence with the difference $2n$ in the number of teeth of the two gears 2, 3 (n is a positive integer). The difference in the number of teeth is typically two. For example, when the rigid internally toothed gear 2 is immobilized so as not to rotate, the flexible externally toothed gear 3 rotates at a substantially reduced speed relative to the rotation (input rotation) of the wave generator 4. Therefore, it is possible for reduced-speed rotation to be taken off from the flexible externally toothed gear 3 to the load side.

The rigid internally toothed gear 2 is provided with an annular rigid member 21 and internal teeth 22 formed on a circular inner peripheral surface of the rigid member 21. Bolt holes 23 are formed at predetermined intervals on the rigid member 21 along the circumferential direction, and pass through the rigid member 21 in the direction of a center axis line 1a of the device.

The cup-shaped flexible externally toothed gear 3 is provided with a cylindrical middle part 31 capable of flexing in the radial direction; a diaphragm 32 that is continuous with a trailing end of the cylindrical middle part 31 and extends inward in the radial direction; and a thick-walled annular boss 33 formed continuously on an inner peripheral edge of the diaphragm 32. Bolt holes 34 for attaching are formed on the boss 33 at predetermined angular intervals in the circumferential direction. External teeth 36 are formed on a portion of an outer peripheral surface of the cylindrical middle part 31 toward an opening edge 35 on the cylindrical middle part 31.

Figure 3:
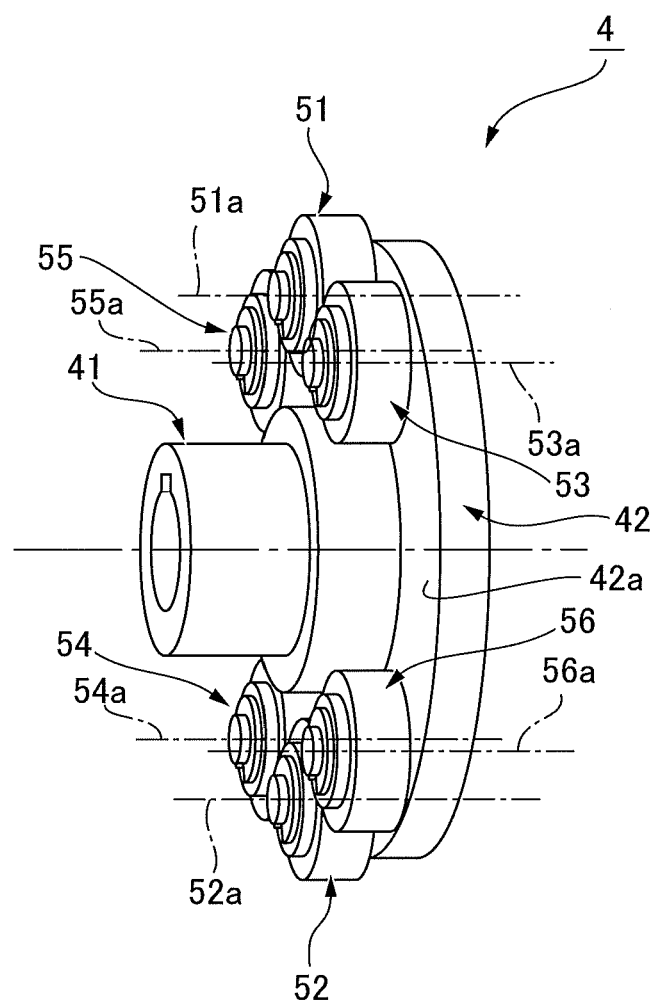
FIG. 3 is a perspective view representing the wave generator of the wave gear device of FIG. 1.

FIG. 3 is a perspective view representing the wave generator 4. Reference is made to FIGS. 1 to 3 in the following description. The wave generator 4 is provided with: a hollow input shaft 41; a support disc 42 coaxially fixed to an outer peripheral surface of the hollow input shaft 41, or formed as an integral component with the hollow input shaft 41; and six rollers 51 to 56 attached to the support disc 42. Of the rollers, rollers 51, 52 are a pair of first rollers arranged in a point-symmetric position relative to the center of the flexible externally toothed gear 3. Similarly, rollers 53, 54 are a pair of second rollers arranged in a point-symmetric position relative to the center of the flexible externally toothed gear 3, and rollers 55, 56 are a pair of third rollers arranged in a point-symmetric position relative to the center of the flexible externally toothed gear 3.

The first pair of rollers 51, 52 are positioned on the major axis L1 of the ellipsoidally flexed flexible externally toothed gear 3. The rollers 51, 52 make contact with the inner peripheral surface 37, so that an inner peripheral surface 37 of a portion of the flexible externally toothed gear 3 where the external teeth 36 are formed is flexed outward. The second pair of rollers 53, 54 are arranged in a position rotated a predetermined angle clockwise from the major axis L1 between the major axis L1 and minor axis L2. The rollers 53, 54 make contact with the inner peripheral surface 37, so that the inner peripheral surface 37 of an externally toothed portion of the flexible externally toothed gear 3 is flexed outward. Similarly, the third pair of rollers 55, 56 make contact with the inner peripheral surface 37 in a position where they are linearly symmetric about the major axis L1, relative to the second pair of rollers 53, 54, so that the inner peripheral surface 37 of the flexible externally toothed gear 3 is flexed outward.

As represented in FIG. 2, the first roller 51 is provided with a support shaft 61 fixed to an end face 42a of the support disc 42, and a support bearing 62 attached to an outer peripheral surface of the support shaft 61, the support bearing 62 of the present example being a deep-groove ball bearing. The support bearing 62 is provided with: an inner race 63 fixed to the support shaft; an outer race 64 making contact with the inner peripheral surface 37 of the externally toothed portion of the flexible externally toothed gear 3; and a plurality of balls 65 rollably inserted in an annular raceway formed between the inner race 63 and the outer race 64. Since the other rollers 52 to 56 are of an identical structure a description has been omitted.

The first rollers 51, 52 are of the same size, and therefore the respective support bearings thereof are of the same size. The second rollers 53, 54 and the third rollers 55, 56 are of the same size, as are the respective support bearings. The support bearings of the first rollers 51, 52 are larger than the support bearings of the second rollers 53, 54 and the third rollers 55, 56, and have a higher dynamic load rating. The size of the first through third rollers 51 to 56 is determined on the basis of a load applied to each of the rollers 51 to 56 during operation of the wave gear device 1 under load.

Figure 4:
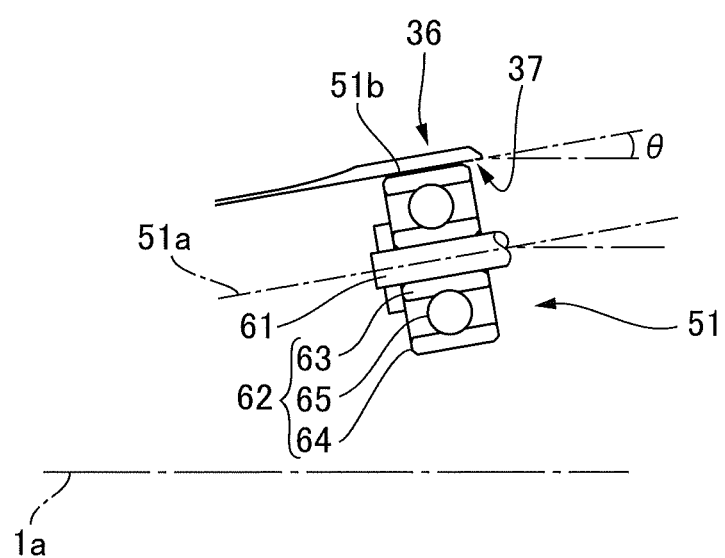
FIG. 4 is a schematic view representing the arrangement of the rollers positioned on the major axis of the ellipsoidally flexed flexible externally toothed gear.

FIG. 4 is a schematic view of an instance where the ellipsoidally flexed flexible externally toothed gear 3 is sectioned along a plane including a center axis line 51a of the first roller 51 positioned on the gear center axis line and the major axis L1 of wave generator 4.

As represented in the drawing, a circular outer peripheral surface 51b of the first roller 51 extends in a direction along the inner peripheral surface 37 of the externally toothed portion of the ellipsoidally flexed flexible externally toothed gear 3. Therefore, the support shaft 61 of the first roller 51 is fixed to the support disc 42 so as to be parallel with the inner peripheral surface 37. Specifically, the direction of the center axis line 51a of the first roller 51 is set so that its incline is identical to incline θ of the inner peripheral surface 37 on the major axis, relative to the center axis line 1a (gear center axis line) of the device. The direction of the center axis line 52a of the other first roller 52 is set in the same way.

Similarly, the direction of a center axis line 53a of the second roller 53 is set so as to extend in the same direction as the inner peripheral surface 37 of the externally toothed portion touching the second roller 53. A center axis line 54a of the other second roller 54 is set in the same way. Furthermore, the directions of center axes 55a, 56a of the third rollers 55, 56 respectively are set in the same way.

According to the wave gear device 1 structured as described above, the circular outer peripheral surface of each of the first through third rollers 51 to 56 of the wave generator 4 can be brought into contact with the inner peripheral surface 37 of the externally toothed portion of the flexible externally toothed gear 3, in the tooth-trace direction of the external tooth 36, without deflection. Therefore, it is possible to improve the angular transmission precision of the wave gear device 1.

Figure 5:
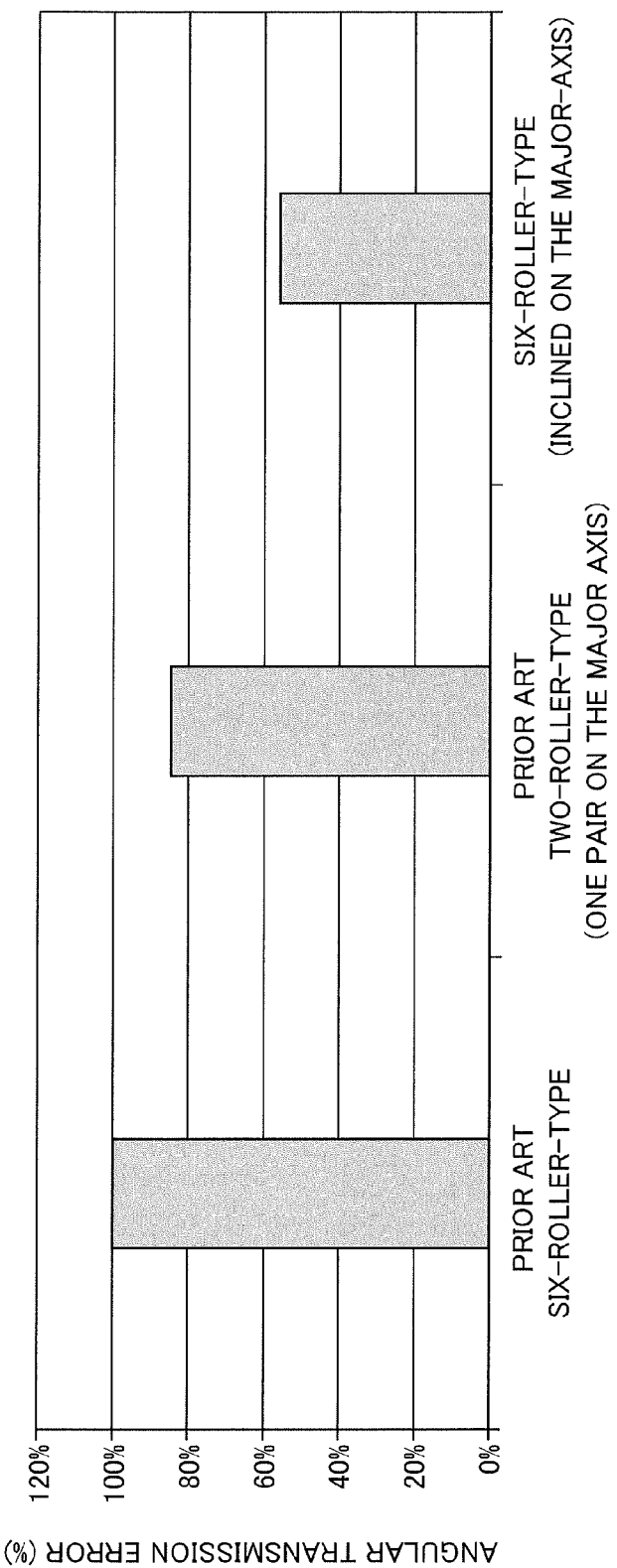
FIG. 5 is a graph representing the magnitude of angular transmission error (expressed as a percentage) when using a conventional two-roller-type wave generator and the six-roller-type wave generator of the invention, in which the angular transmission error of a conventional six-roller-type wave generator is used as an index.

FIG. 5 is a graph representing the effect when using the present invention, and the graph represents the magnitude of angular transmission error (expressed as a percentage) when using a conventional two-roller-type wave generator and the six-roller-type wave generator of the invention, in which the angular transmission error of a conventional six-roller-type wave generator is used as an index. Taking the angular transmission error when using the conventional six-roller-type wave generator to be 100%, the angular transmission error in the conventional two-roller-type wave generator was observed to be slightly more than 80% of the conventional six-roller-type wave generator. In contrast, it was confirmed that the angular transmission error could be reduced to slightly less than 60% of the conventional wave generator when using the six-roller-type wave generator 4 of the present invention.

Since the rollers 51 to 56 used were of a size suitable for load distribution of the wave generator 4 during operation under load, it is possible to efficiently improve the service life of the wave gear device 1.

(Other Embodiments)

According to the wave generator 4, the center axis lines 51a to 56a of each of the rollers 51 to 56 are inclined. It is also possible for the center axis lines 51a to 56a of each of the rollers 51 to 56 to set so as to be parallel to the center axis line 1a of the wave gear device 1, and for the outer peripheral surface of the rollers to be tapered.

Figure 6:
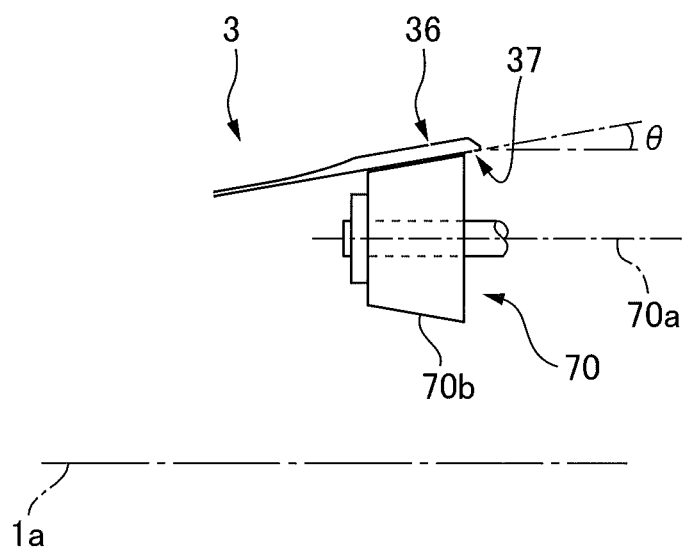
FIG. 6 represents another example of a roller.
Figure 7:
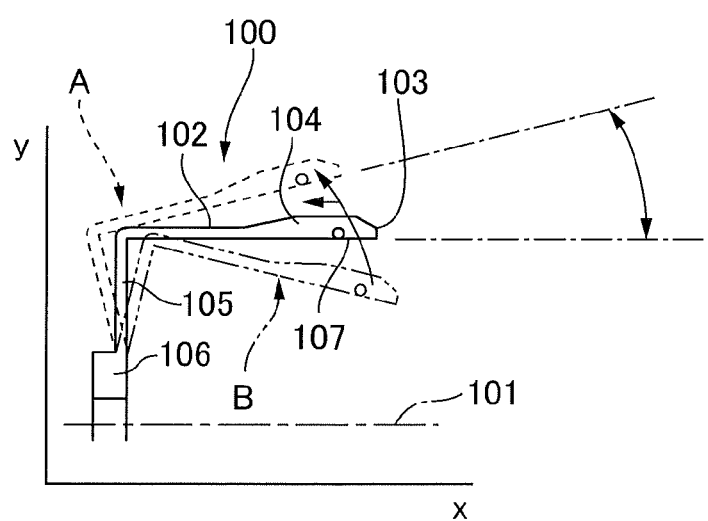
FIG. 7 is an illustrative drawing representing the cup-shaped flexible externally toothed gear in a flexed state.

For example, as represented in FIG. 6, a circular outer peripheral surface 70b of each of the rollers 70 of the wave generator is tapered along the inner peripheral surface 37 of the externally toothed portion, and the roller is fixed to the support disc (not shown) of the wave generator with a center axis line 70a of a support shaft of the roller 70 being in a state of extending parallel to the center axis line of the device. In such instances as well, the circular outer peripheral surface 70b of each of the rollers 70 can be brought into contact with the inner peripheral surface 37 of the externally toothed portion of the flexible externally toothed gear 3, without deflection.

The examples above relate to a six-roller-type wave generator used in a cup-type wave gear device. The present invention may also be used in "silk-hat-type" wave gear devices provided with a silk-hat-shaped flexible externally toothed gear.

The present invention may also be used in roller-type wave generators that are not of a six-roller configuration. Specifically, the invention can be used in wave generators provided with one pair of rollers, or wave generators provided with more than six rollers. For example, the present invention may even be used in wave generators comprising a total of ten rollers, where four pairs of rollers are provided in addition to one pair of rollers on the major axis.

The invention claimed is:

1. A wave generator of a wave gear device in which a cup-shaped or a silk-hat-shaped flexible externally toothed gear is flexed into a predetermined ellipsoidal shape and formed into a state of partially meshing with a rigid internally toothed gear, a position in which both gears mesh is moved in a circumferential direction as the wave generator rotates, and relative rotation corresponding to the difference in the number of teeth on the gears is generated between both gears, wherein a plurality of rollers are provided for contacting an inner peripheral surface of the flexible externally toothed gear and flexing the flexible externally toothed gear into the ellipsoidal shape;

the rollers include at least two first rollers arranged on a major axis of the ellipsoidal shape; and when the ellipsoidally flexed flexible externally toothed gear is sectioned along a plane including a gear axis center line and the major axis, a circular outer peripheral surface of the first rollers is inclined relative to the gear center axis line so that an incline thereof is identical to an incline, relative to the gear center axis line, of a region of the inner peripheral surface making contact with the outer peripheral surface of the first rollers on the flexible externally toothed gear.

2. The wave generator of the wave gear device of claim 1, wherein the first rollers are provided with the circular outer peripheral surface of identical size; and a roller center axis line of the first rollers is inclined relative to the gear center axis line.

3. The wave generator of the wave gear device of claim 2, wherein the rollers include a plurality of second rollers in addition to the first rollers; and when the ellipsoidally flexed flexible externally toothed gear is sectioned along a plane including the gear center axis line and a roller center axis line of the second rollers, the roller center axis line of the second rollers is inclined relative to the gear center axis line so that the incline thereof is identical to an incline, relative to the gear center axis line, of a region the of the inner peripheral surface making contact with an outer peripheral surface of the second rollers.

4. The wave generator of the wave gear device of claim 2, wherein the rollers include at least two second rollers and two third rollers in addition to the first rollers;

each of the second rollers is in a point-symmetric position relative to the center of the ellipsoidal shape and is arranged between the major axis and a minor axis of the ellipsoidal shape;

each of the third rollers is arranged in a position of linear symmetry about the major axis, relative to each of the second rollers;

when the ellipsoidally flexed flexible externally toothed gear is sectioned along a plane including the gear center axis line and a roller center axis line of the second rollers, the roller center axis of the second rollers is inclined relative to the gear center axis line so that the incline thereof is identical to an incline, relative to the gear center axis line, of a region of the inner peripheral surface making contact with the outer peripheral surface of the second rollers on the flexible externally toothed gear; and a roller center axis line of the third rollers is inclined relative to the gear center axis line at an angle identical to that of the roller center axis line of the second rollers.

5. A wave gear device having a rigid internally toothed gear, a flexible externally toothed gear capable of flexing in a radial direction and coaxially arranged on an inside of the rigid internally toothed gear, and a wave generator for flexing the flexible externally toothed gear into an ellipsoidal shape and causing meshing with the rigid internally toothed gear in a region on a major axis of the ellipsoidal shape, wherein the wave generator is provided with a plurality of rollers that contact an inner peripheral surface of the flexible externally toothed gear and flex the flexible externally toothed gear into the ellipsoidal shape;

the rollers include at least two first rollers arranged on the major axis of the ellipsoidal shape; and when the ellipsoidally flexed flexible externally toothed gear is sectioned along a plane including a gear center axis line and the major axis thereof, a circular outer peripheral surface of the first rollers is inclined relative to the gear center axis line so that the incline thereof is identical to an incline, relative to the gear center axis line, of a region of the inner peripheral surface making contact with the outer peripheral surface of the first rollers on the flexible externally toothed gear.

6. The wave gear device of claim 5, wherein the first rollers are provided with the circular outer peripheral surface of identical size; and a roller center axis line of the first rollers is inclined relative to the gear center axis line.

7. The wave gear device of claim 6, wherein the rollers include a plurality of second rollers in addition to the first rollers; and when the ellipsoidally flexed flexible externally toothed gear is sectioned along a plane including the gear center axis line and a roller center axis line of the second rollers, the roller center axis line of the second rollers is inclined relative to the gear center axis line so that the incline thereof is identical to an incline, relative to the gear center axis line, of a region of the inner peripheral surface making contact with an outer peripheral surface of the second rollers on the flexible externally toothed gear.

8. The wave gear device of claim 6, wherein the rollers include at least two second rollers and two third rollers in addition to the first rollers;

each of the second rollers is in a point-symmetric position relative to the center of the ellipsoidal shape and is arranged between the major axis and a minor axis of the ellipsoidal shape;

each of the third rollers is arranged in a position of linear symmetry about the major axis, relative to each of the second rollers; and when the ellipsoidally flexed flexible externally toothed gear is sectioned along a plane including the gear center axis line and the roller center axis line of the second rollers, the roller center axis line of the second rollers is inclined relative to the gear center axis line so that the incline thereof is identical to an incline, relative to the gear center axis line, of a region of the inner peripheral surface making contact with an outer peripheral surface of the second rollers on the flexible externally toothed gear; and a roller center axis line of the third rollers is inclined relative to the gear center axis line at an angle identical to that of the roller center axis line of the second rollers.

* * * * *